United States Patent [19]

Reinken et al.

[11] Patent Number: 5,222,625
[45] Date of Patent: Jun. 29, 1993

[54] PARTS FEEDING AND LOADING APPARATUS

[75] Inventors: Robert B. Reinken; Timothy L. Rumpsa, both of St. Louis County, Mo.

[73] Assignee: Sunnen Products Company, St. Louis, Mo.

[21] Appl. No.: 887,463

[22] Filed: May 22, 1992

[51] Int. Cl.$^5$ .............................................. B65G 59/00
[52] U.S. Cl. .................................... 221/113; 221/121; 221/278
[58] Field of Search ............... 221/22, 113, 11, 119, 221/121, 122, 278, 279, 79, 88, 234; 82/125, 127, 1.2

[56] References Cited

U.S. PATENT DOCUMENTS

| | | | |
|---|---|---|---|
| 1,644,371 | 10/1927 | Goldman | 221/121 |
| 2,621,096 | 12/1952 | Broyles et al. | 312/70 |
| 2,635,395 | 4/1953 | Arms et al. | 51/103 |
| 2,777,604 | 1/1957 | Welch | 221/113 |
| 3,018,820 | 1/1962 | Stevens | 156/465 |
| 3,029,978 | 4/1962 | Gummere et al. | 221/22 |
| 3,422,597 | 11/1969 | Beer | 221/278 |
| 4,187,748 | 2/1980 | Evans | 82/2.5 |
| 4,224,845 | 9/1980 | Flisch | 221/234 |

Primary Examiner—Robert P. Olszewski
Assistant Examiner—Kenneth Noland
Attorney, Agent, or Firm—Haverstock, Garrett and Roberts

[57] ABSTRACT

A parts loading apparatus comprising a turret structure having one or more passages therethrough for receiving and holding a row of parts to be fed therefrom one at a time, the plurality of such passages being arranged at angularly spaced locations around a central axis, each having an opening adjacent one end from which the parts held therein can pass, and a rotary actuator mechanism operatively connected to the turret structure to rotate the structure to locate different ones of the passages in alignment with a parts receiving fixture adjacent to one end of the passage and with a source of pressure adjacent to the opposite end of the passage. The subject parts loading apparatus may also be constructed to have a single elongated tubular member capable of holding a row of aligned parts therein with the piston positioned therein adjacent one end of the row of parts whereby applying pressure into the passage moves the piston and the row of parts therein and ejects the end most part therefrom.

14 Claims, 4 Drawing Sheets

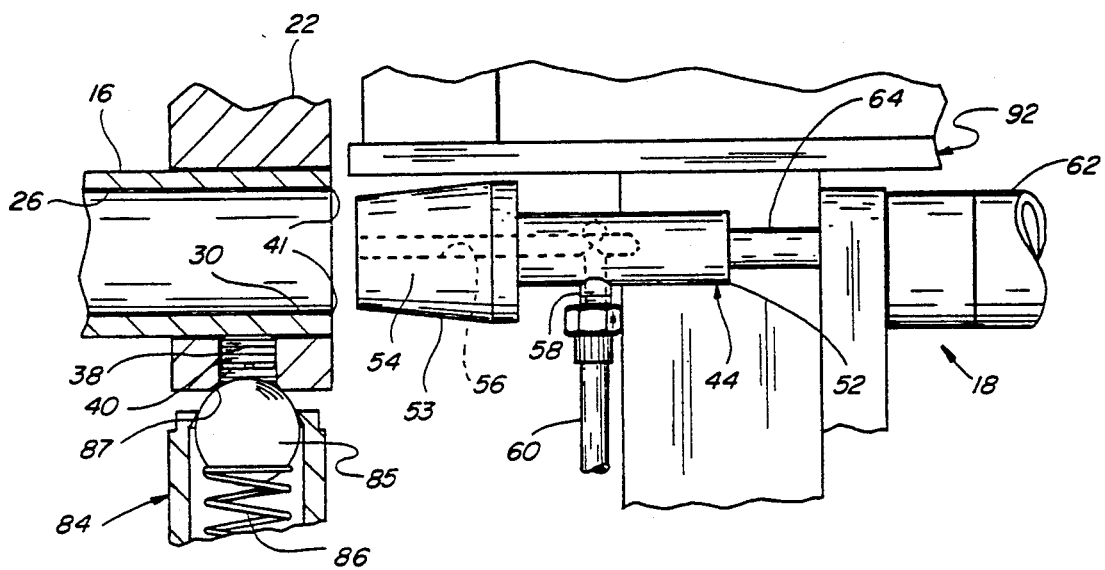
Fig. 4
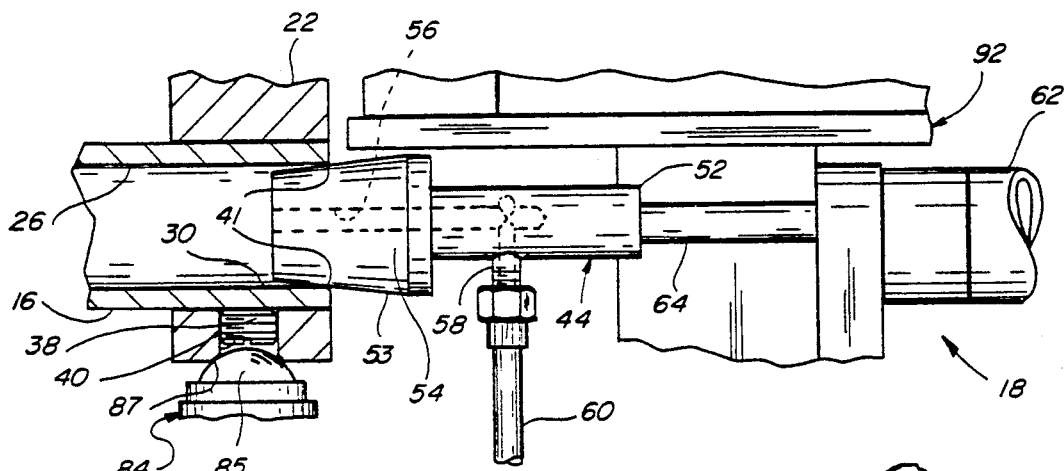
Fig. 5
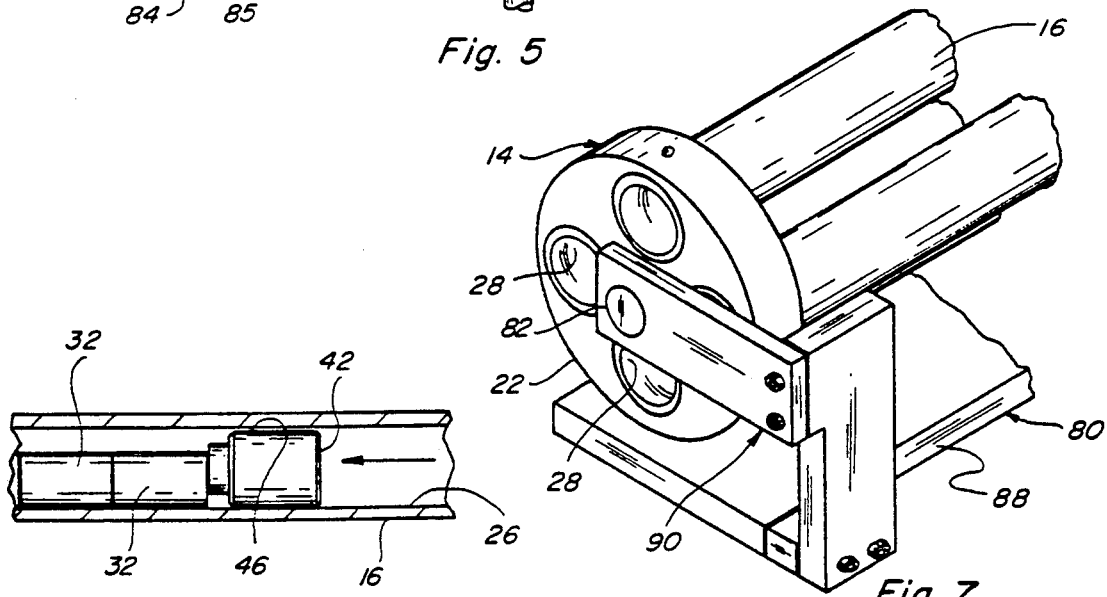
Fig. 3
Fig. 7

PARTS FEEDING AND LOADING APPARATUS

The present invention relates generally to devices for feeding and loading parts, workpieces and other items into workstations and the like, and more particularly, to a versatile parts feeding and loading device which can be used for effectively automating a wide variety of loading operations wherein a steady supply of parts or other items are required to be precisely fed and loaded one at a time in a predetermined orientation to a holding fixture or other receiving means on a workstation such as on a honing machine or other device. The present parts feeder and loader can hold a relatively large quantity of parts in a predetermined order and orientation ready for feeding and loading, and can automatically and precisely feed and load the parts individually and in a desired order or sequence directly to the holding device or other receiver means on the workstation as required, thereby enabling the parts loader to operate unattended for relatively long periods of time. The present device is further positionable for loading parts in a plurality of directions including horizontally and even upwardly, and is adaptable for feeding and loading a variety of parts or other items of different sizes and shapes. The device can further be used for loading parts to a variety of workstations and other devices such as machine tools, assembly stations, pick-up stations, robotic work cells and the like, and is especially well suited for loading parts or workpieces into honing machines where each part has a surface to be operated on or honed.

BACKGROUND OF THE INVENTION

Various devices for holding a quantity of parts and automatically or semi-automatically loading the parts to an assembly station, a workstation or other device or location have been devised and used. Such prior devices however, generally lack sufficient adaptability and versatility for use in a wide variety of loading applications and further suffer from numerous other limitations and shortcomings. For example, Gummere et al U.S. Pat. No. 3,029,978 discloses an apparatus for feeding items such as fasteners individually and in succession from an upstanding reservoir to a pick-up or assembly station. The upstanding reservoir comprises a plurality of vertically oriented tubes from which parts can be gravitationally fed to a horizontally reciprocating slide member located below the reservoir, which slide member moves in the horizontal direction to deliver the items to a pick-up station. Such prior construction is limited, however, in that the reservoir or other parts holding means must be upstanding to enable gravitational feed of the parts therefrom, and further, the device requires means such as a reciprocating slide member for transfer of the items in the horizontal direction to the pick-up station or other destination. Still further, such prior device has no loading means adaptable for positively and precisely loading a variety of parts or items of different sizes and shapes. Contrasted to the relatively limited use device discussed above, the subject invention relates to a parts loading device which is adaptable for holding, feeding and loading a wide variety of parts or other items in a desired predetermined orientation and order, which device can be positioned horizontally or at any other desired orientation including for loading parts upwardly, and which device can positively feed and load the parts individually and sequentially directly to a receiving or holding means on a workstation or other device without additional sliding members or other transfer means.

SUMMARY OF THE INVENTION

The present invention overcomes many of the shortcomings and limitations associated with known parts feeding and loading devices and teaches the construction and operation of a compact yet large capacity automatic parts feeder and loader which can be used for a wide variety of operations wherein parts or other items are precisely fed and loaded one at a time and in a particular orientation and position to a holding fixture or other holding or receiving means on a workstation or other device. The parts loader comprises a turret assembly or structure having one or more passages or chambers adapted for receiving and holding a plurality of parts in single file order and in a desired orientation therein, the preferred turret construction having a plurality of such passages or chambers arranged in angularly spaced relation around a central axis. Importantly, the turret can be positioned with its output or forward end adjacent to a holding fixture of a workstation and each passage has an output open end from which the parts positioned therein can pass such that parts can be fed and loaded directly from the respective passage to the holding fixture. The preferred multiple passage turret is supported for rotation about its central axis and the parts loader preferably includes means for rotating and stopping or indexing the turret for positioning any selected one of the passages in a predetermined position in alignment with the holding fixture for loading parts thereto. For a parts loader having only one passage, the turret or structure need not rotate and can be fixed in the feeding and loading position, as desired. Important also, when a passage is in the loading position, it is also in position or alignment for receiving or engaging or otherwise cooperating with parts advancing means on the loader which are preferably operable to advance the parts in the passage toward that output end and positively eject the endmost part from the passage and into the holding device using air or other fluid under pressure as discussed in greater detail below.

In a typical feeding and loading operation or sequence, the preferred multiple passage turret can be rotated and indexed to locate a particular selected passage in the feeding and loading position. The parts advancing means can then be operated to cooperatively engage an end of the selected passage and positively force or eject the endmost part from the passage and load it directly to the holding device or other receiving means on the workstation, all of the remaining parts in the passage being simultaneously advanced by the loading action toward the output end of the passage such that the next adjacent part is moved into the endmost or loading position. The parts located in the passage are all properly oriented for loading. This condition of the advancing means is maintained while a part is ejected by maintaining sealing contact thereof with the surface of the passage, and further even after the part leaves the passage by the momentum imparted to the part by the driving force of the advancing means, which force is adjustable by varying the air pressure and the duration of the pressurized condition used for loading. The positive loading action drives the ejected part into the fixture and against a hard stop or other locating and positioning means thereon for stopping the part, the stopping of the loaded part also halting the advancement of the remaining parts in the passage. Means on the workstation such as a parts gripper or the like can then be operated to hold the loaded part as required for a particular workstation operation. After a part has been loaded, the advancing means can be withdrawn from the passage and any remaining air under pressure released. The turret can then remain in position for loading the next part from the same passage, or alternatively, can be rotated and indexed to locate any of the other passages in loading position, such rotation and indexing occurring even while the workstation operations are conducted on the previous part, thereby saving time. When the workstation operation is complete, the previously loaded part can be ejected therefrom, and the loading sequence repeated as required. The parts loader can operate in the above manner unattended or with little operator attention for as long as desired or until the supply of parts therein is exhausted. When empty or when otherwise desired, the turret can be relatively quickly and easily reloaded, or alternatively, replaced with a full turret as desired. The stop means, holding means and ejecting means associated with the workstation and discussed above do not form part of the present invention.

An important feature of the present parts loader is its adaptability and adjustability for holding, feeding and loading a wide variety of parts of different size and shape and also its capability for use with a wide variety of workstations and other devices. The turret portion of the parts loader can comprise a unitary member having one or more passages or chambers therein, or alternatively a structure comprising one or more tubular members, both constructions providing a desired number of passages for receiving a plurality of parts, workpieces or other items in end-to-end abutting relation therein. The passages can each have a desired cross-sectional shape and size which allows parts to be easily and freely movable longitudinally therealong, the output opening to each passage also being sized and shaped to enable the passage of parts therethrough. The passages further preferably include a rear open end located opposite the output opening, which rear opening is adapted for receiving and engaging or otherwise cooperating with the parts advancing means. The turret assembly can be positioned in a plurality of desired orientations including horizontally and even inclined at an acute angle to horizontal for loading parts upwardly, as may be required for a particular parts loading application. The turret member can further optionally include means enabling the turret to be quickly detached and removed from the parts loader, as desired.

The parts advancing means preferably comprise a piston or plunger member, one being located in each of the passages and movable longitudinally therein, and also means for introducing air or other fluid under pressure into the passage for driving or propelling the piston toward the output or forward end of the passage with sufficient force such that all of the parts in the passage are advanced and the forwardmost part in the passage is ejected, as discussed above. The pressurized air is introduced into the rear open end of the passage position using means such as an air fitting movable or extendable to cooperatively and sealably engage the rear open end of the passageway, the air fitting communicating air or other fluid under pressure with the passage from a suitable source such as from a compressed air or gas system or reservoir. The pressure of the air is preferably adjustable to enable adjusting the advancing force or action of the parts advancing means for a wide variety of parts advancing applications and also to enable adjusting or tuning the parts loading action. For instance, the pressure can be made to be relatively low for loading small lightweight or fragile parts, or for loading parts from a horizontal turret. Alternatively, the pressure can be adjusted to be relatively high for loading heavier parts, or for loading parts upwardly or where a particularly forceful positive loading action is required and where the force on the ejected part must be sufficient to operate a switch or trip a lever.

The duration of the pressurized condition in the passage is also variable, the preferred condition being a short duration pulse or burst of air under pressure sufficient for ejecting and loading a part, the pressurized condition being releasable using any suitable means or by removal of the air fitting from sealed cooperation with the rear open end of the passage. For example, a shorter duration pulse or burst of air under pressure can be used for loading parts into holding fixtures or the like which may be fast acting, while longer pulses can be used, for instance, to maintain the piston pressure for greater duration against the row of heavier parts.

The piston members in each of the passages of the turret are freely and easily movable longitudinally therealong and are sized and shaped and have their outer surface in close proximity with the internal surface of the tube or passage providing a sufficient barrier or seal to the loss of the pressurized condition between the piston and internal surface to enable the piston to be driven or propelled or otherwise forced against the rearmost part by the pressurized condition. The piston members can also optionally include seal means around a portion of the outer surface thereof for even more sealably engaging the internal surface of the passage. Means can also be included for preventing the piston member from being ejected from the output open end of the passageway after all the parts have been loaded.

The fluid fitting means preferably comprise a member or assembly located adjacent to the rear end of the turret assembly which is movable or extendable using an air cylinder or other means to cooperatively and sealably engage the rear open end of a passage located in the loading position, and to also move away or retract therefrom for such purposes as to release the pressurized condition in the passage and to enable indexing the turret. The fluid fitting means preferably include removable seal or stopper means having a conduit therethrough providing for the passage of the fluid, such as air, under pressure and an outer shape, such as forming a tapered annulus, sized for cooperatively and sealably engaging the rear open end of a passage, which seal means can be replaced by different size seal means adapted for use with different turret assembly configurations and tube sizes, as desired. Also to accommodate different turret configurations, the radial spacing between the air fitting and the axis of the turret can be made adjustable.

The turret can be rotatably supported at the ends thereof for rotation about its central longitudinal axis using conventional means such as bearings or the like. One or more clutch means can also be provided to enable the turret to be rotated in a desired direction only, the bearing and clutch means preferably comprising combination roller clutch and bearing assemblies located at opposite ends of the turret assembly. The turret can also be rotated to position or index different of the passages in the loading position using any suitable rotating and indexing means such as a rotary actuator device. Such a rotary actuator can be a pneumatic, a hydraulic, a servo, an electric or other device capable of rotating the turret and accurately stopping the rotation with a desired passage in the loading position. The angular displacement of rotation of the rotary actuator can be optionally adjustable so as to be rotatable through different angular displacements corresponding with the angular spacing between passages for different turret configurations. The preferred rotary actuator device is a pneumatically operated actuator which rotates in a first direction through a predetermined or adjustable angular displacement when pressurized air is supplied to the actuator through a first air line. The actuator also moves in the opposite direction through the same displacement when pressurized air is directed thereto through a second air line. Means for stopping the rotation can be internal to the actuator or, alternatively, external to the actuator, such as hard stop means which are engageable at desired angular positions of rotation by members on the rotating portion of the actuator, which hard stops can be fixed or adjustable, as desired. The parts loader can optionally include suitable means for holding or maintaining the turret at a desired angular positions of rotation with a selected passage in the loading position, such as by a spring loaded detent device or the like.

The turret can be supported in any desired manner for positioning the output end thereof for loading parts to the workpiece receiving means of a workstation. For instance, a preferred embodiment comprises a structure which is fixedly mounted on or adjacent to the workstation and supports the turret in a cantilever manner. The turret can be detachably mounted on the support structure to enable quick and easy removal and replacement of the turret for such purposes as to allow parts to be loaded into the turret or for replacement of the turret itself. The support structure can also optionally include adjustable aligning means enabling support of a variety of turret configurations having differently shaped, sized and spacedly related passages.

OBJECTS OF THE INVENTION

It is a principal object of the present invention to provide an improved automatic parts feeder and loader which can hold a relatively large supply or quantity of parts or other items in a desired orientation and order and can be used to dispense the parts one at a time, in the same orientation and in a desired sequence.

Another object is to provide a parts feeder and loader which includes a parts holding turret which can receive and hold a large number of parts in end-to-end relation in one or more passages arranged around an axis about which the turret can be rotated to locate any of the passages in the loading position.

Another object is to provide a parts feeder and loader having a compact yet large capacity rotatable turret assembly or structure that can be positioned close to a workstation or other device into which parts are to be fed and loaded.

Another object is to provide a parts feeder and loader having a rotatable turret structure which can be operated in a plurality of desired orientations.

Another object is to provide a parts loader which can hold parts in any of a plurality of passages in a rotatable turret and which can be selectively positioned to eject parts from any selected passage using the same parts advancing means.

Another object is to provide a parts loader having parts advancing means which are operable to positively and precisely load parts individually and in a desired orientation to a receiving and holding device on a honing or other machine tool.

Another object is to make the loading of parts to a machine tool faster.

Another object is to eliminate intermediate parts handling and transfer operations in a parts loading operation.

Another object is to automate repetitious machine tool operations.

Another object is to provide an automatic parts loader for honing machines and the like which is adjustable and adaptable for accommodating parts of different sizes, shapes and diameters.

Another object is to provide a parts loader which is adaptable for loading parts or other items to a wide variety of workstations and other devices and locations.

These and other objects and advantages of the present invention will become apparent after considering the following detailed specification of a preferred embodiment in conjunction with the accompanying drawings.

BRIEF DESCRIPTION OF THE DRAWINGS

FIG. 3 is an enlarged fragmentary partial cross-sectional view of the tubular member of FIG. 2, showing the relation of the piston member therein with the row of parts and with the internal surface of the tube;

FIG. 4 is an enlarged fragmentary partial cross-sectional elevational view of a portion of the parts loader of FIG. 1, showing the air fitting thereof in a retracted position in alignment with one end of one of the tubular members;

FIG. 5 is a view similar to FIG. 4 showing the air fitting in an extended position engaged with the end of one of the tubular members;

FIG. 7 is a fragmentary perspective view of the parts loader of FIG. 1 showing the output end portion of an alternative embodiment of the turret structure.

DETAILED DESCRIPTION OF THE PREFERRED EMBODIMENTS

Figure 1:
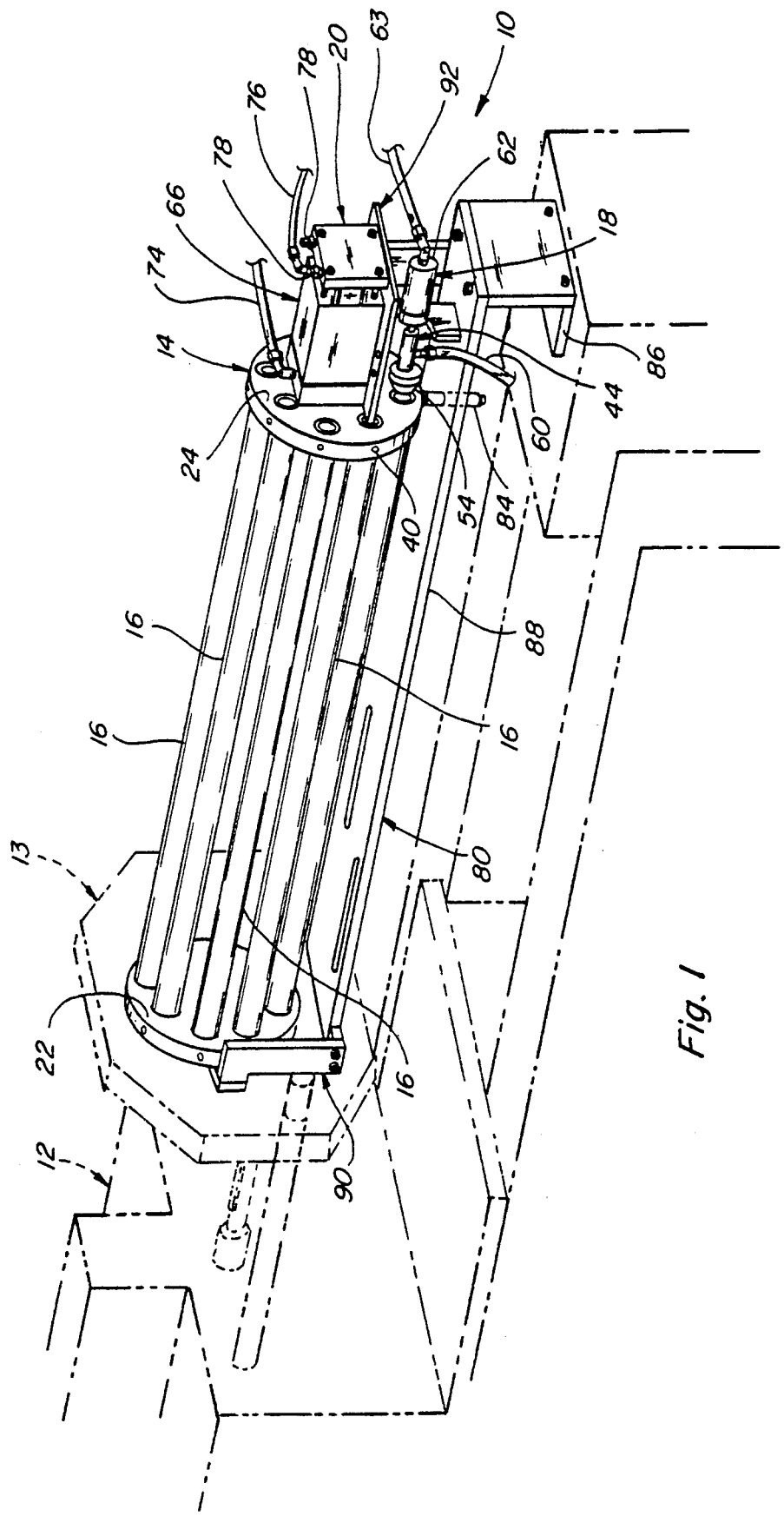
FIG. 1 is a perspective view of a parts feeding and loading apparatus constructed according to the teachings of the present invention, the apparatus being shown in conjunction with a workstation illustrated in phantom outline.

Referring to the drawings more particularly by reference numbers, wherein like numerals refer to like parts, FIG. 1 shows a parts feeding and loading apparatus 10 constructed according to the teachings of the present invention. The parts or workpiece feeding and loading apparatus 10 is shown in conjunction with a workstation 12 having a parts receiving and holding portion of a honing machine used for precision honing holes or bores in the parts or workpieces 32 received from the loader 10. The loader 10 is a relatively compact device for its parts-holding capacity which can be positioned with its output end located adjacent to the parts receiving and holding means such as shown at 13 on the workstation 12 to enable parts to be loaded directly from the loader 10 to the receiving and holding means 13 without intermediate or additional handling. The loader 10 as shown is a multiple passage embodiment and includes a rotatable turret assembly or structure 14 having a plurality of tubular members 16 each having an open ended passage 26 for receiving and holding in end-to-end relation a plurality of items to be loaded such as workpieces or parts 32. The loader 10 also includes a single parts advancing and loading means 18 for expelling workpieces 32 individually from any selected one of the tubes 16 to receiving and holding workstation 12. The device 10 also includes rotating and indexing means 20 for rotating the turret 14 and accurately stopping the rotation to position a selected one of the tubes 16 in a loading position in alignment with the receiving means 13 and also in alignment with the parts advancing and loading means 18. The workpiece or part receiving and holding means 13 may be of known construction such as shown in Cloutier et al U.S. Pat. No. 4,993,189, and in Vanderwal, Jr. et al U.S. Pat. No. 4,827,674, both assigned to Applicant's assignee.

The rotatable turret 14 is an elongated structure having a centrally located axis of rotation extending between a forward or output end wall 22 and an opposite rear end wall 24. The turret 14 is rotatable about the longitudinal axis and can include any desired number of tubular members 16 extending between the opposite end walls 22 and 24 at angularly spaced locations around the longitudinal axis, the embodiment shown having provision for eight tubes 16 spaced at 45 degree intervals around the axis.

Figure 2:
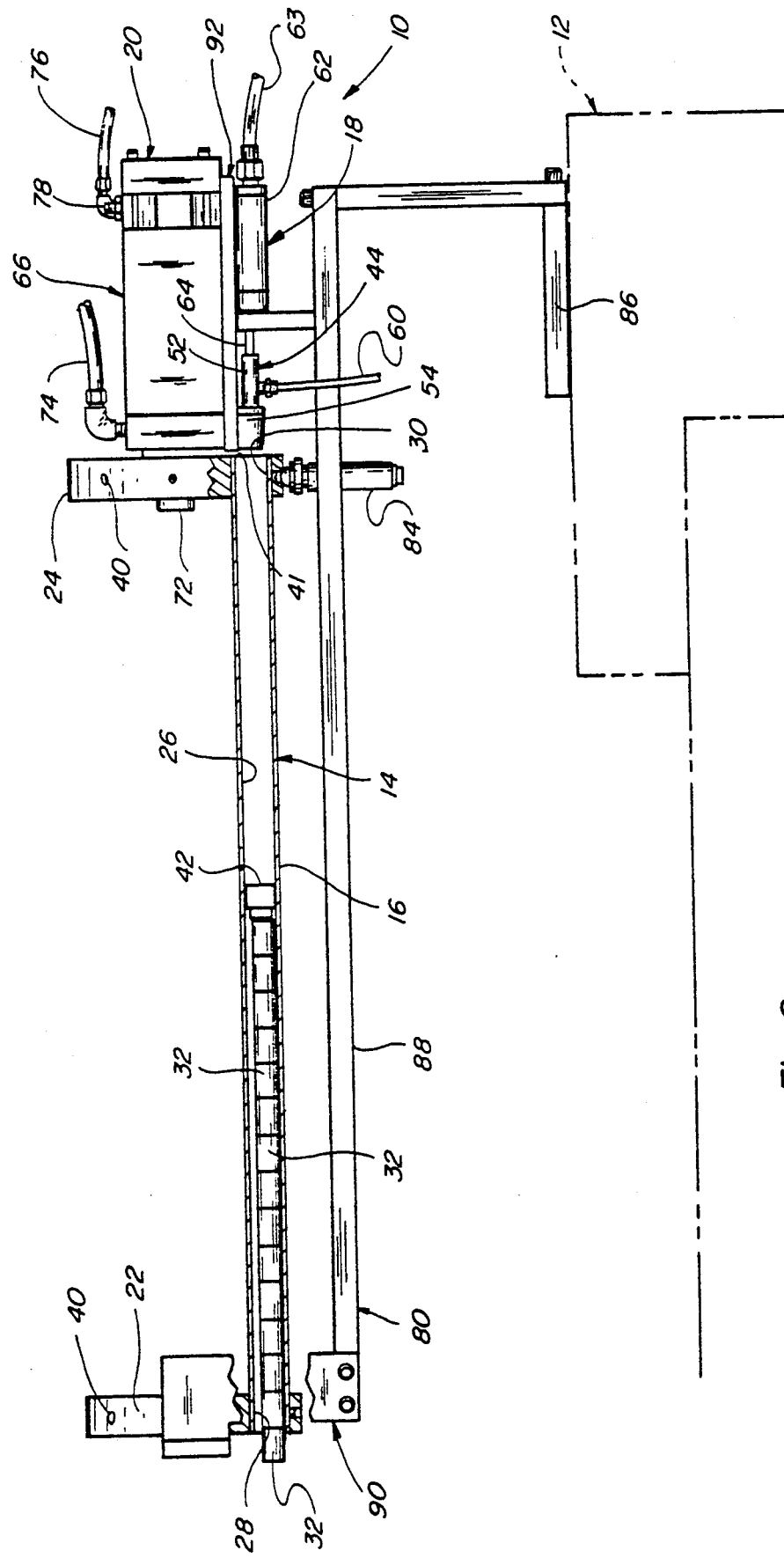
FIG. 2 is a side elevational view of the parts loader of FIG. 1, in partial cross-section to show one of the tubular parts holding members partially loaded with parts.

Referring to FIG. 2, each of the tubes 16 is of open ended construction and has a passage or bore 26 extending from an output open end 28 adjacent to the forward end wall 22 of the turret 14 to an opposite rear open end 30 adjacent to the rear end wall 24. The passage 26 of each tube 16 can receive and hold a plurality of workpieces or parts 32 arranged in a single file row in end-to-end or abutting relation. The passages 26 can have any desired length and cross-sectional shape and size which will enable a plurality of workpieces 32 to be freely movable longitudinally therein, the passages 26 shown having a uniform round cross-sectional shape large enough to accommodate the workpieces 32 as shown.

Figure 6:
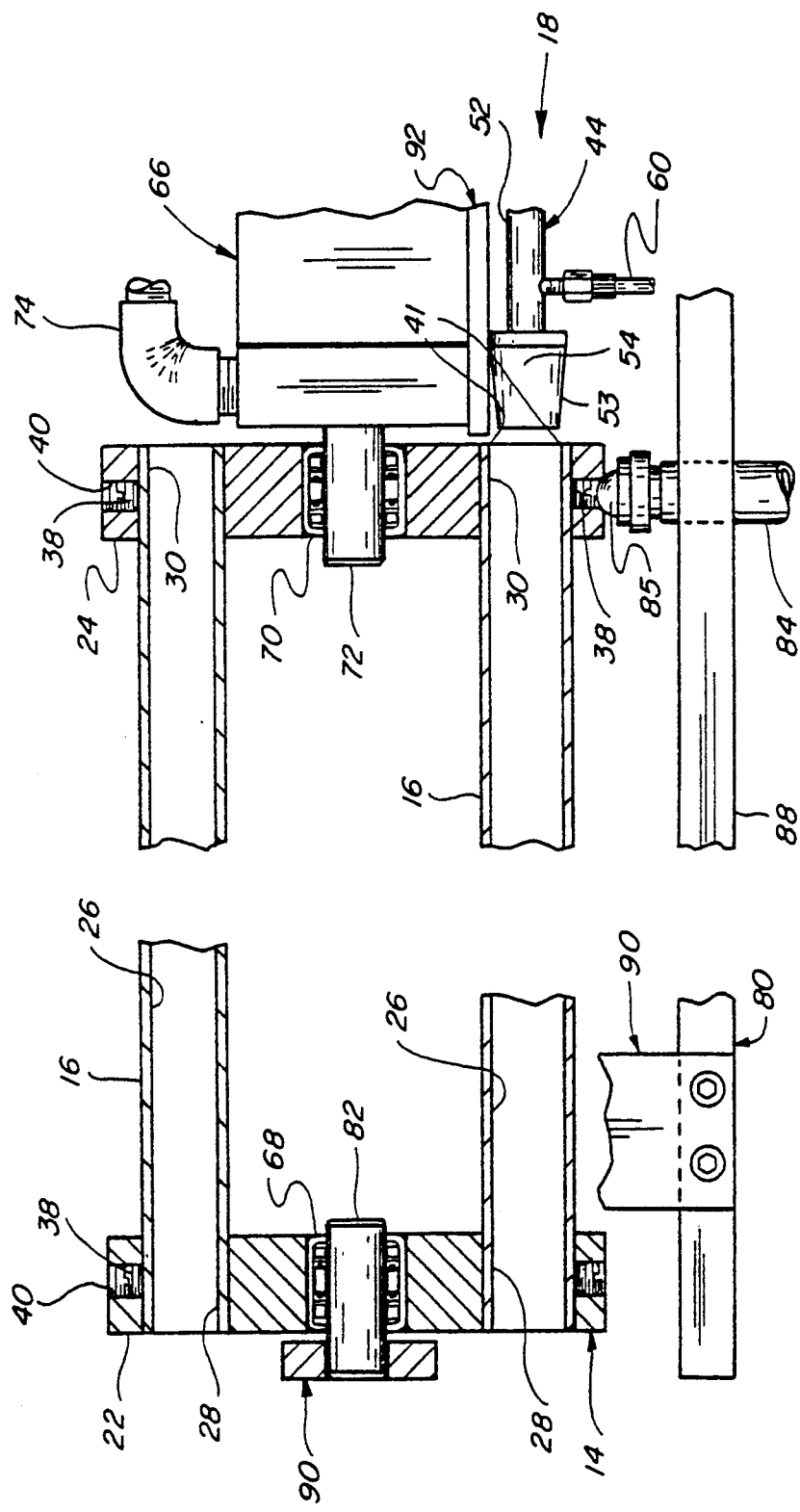
FIG. 6 is a cross-sectional elevational view of a portion of the parts loader of FIG. 1, showing the means for rotatably supporting the turret assembly.

The tubes 16 are maintained in position around the longitudinal axis of the turret 14 by forward and rear end plates 22 and 24 located adjacent, respectively, to the forward and rear ends of the turret assembly 14. The forward end plate 22 and rear end plate 24 each include a plurality of bores extending therethrough for receiving the tubes 16, each tube 16 being secured or maintained in its respective bore by a set screw 38 or like fastener located in a threaded hole 40 which extends from the outer surface of the respective end plate 22 or 24 radially inwardly to the bore, as shown in FIGS. 4, 5 and 6. The threaded holes 40 are optionally also usable for maintaining the rotational position of the turret 14, as described below.

The parts advancing means 18 are operable to engage a rear open end edge 41 of the tube 16 in the loading position and when pressure is introduced into the tube 16, as will be described, will force or advance the row of workpieces 32 located in that passage 26 of the tube 16 toward the output end 28 thereof and in so doing, will push or eject the forwardmost workpiece 32 from the output end 28 and load it in proper position in the workpiece holding means 13. The holding means 13 may include a fixed stop or other locating means therein against which a part 32 moves and is stopped. Importantly, the output end 28 is preferably located sufficiently close to the holding device 13 so that when the ejected part 32 is loaded in the holder 13, the advancement of the next or second part 32 in line is stopped in a position adjacent to the output opening 28, so as to be ready for loading the next time around. Apparatus on the holding device 13 can then grasp or hold the part 32 in position for honing or machining, as described in greater detail in U.S. Pat. Nos. 4,993,189 and 4,827,674. The parts advancing means 18 works in association with a plunger or piston member 42, one such piston member 42 being located in each of the passages 26 in the tubes 16 between the rearmost workpiece 32 therein and the rear opening 30. The advancing means 18 include an air fitting assembly 44 located adjacent to the rear end plate 24 of the turret assembly 14 in position to cooperatively engage the rear open end edge 41 of the tube 16 in the loading position.

The plungers or pistons 42 have cross-sectional shapes and sizes which closely conform to the shape and size of the passages 26 and yet enable the piston to be easily and relatively freely movable in the respective passages 26. The pistons 42 each have an outer surface portion 46 which slideably cooperates with the internal surface 26 of the tube 16 to provide a sufficient barrier to the flow or passage of air between the piston 42 and the surface 26 (see FIG. 3) such that when an elevated pressure condition exists in the passage 26 between the rear end 30 and the piston 42, the piston 42 will be driven or propelled toward the opposite output open end 28 and against the rearmost workpiece 32 in the passage 26. The piston 42 is preferably constructed of a lightweight material having a low surface friction coefficient with the surface 26. One such suitable material is TEFLON or poly-tetra-fluoro ethylene or the like. The pistons 42 can alternatively be constructed of some other plastic, metal or other material and can have seal means such as one or more O-rings therearound (not shown) which cooperate with the internal surface 26 of the bore or passage 26 for better sealing to the passage 26 while maintaining the driving pressure behind the piston 42. The internal surface 26 of the passages 26 is also preferably relatively smooth such that the movement of the pistons 42 therethrough is made easier.

The air fitting assembly 44 is located adjacent the rear end plate 24 of the turret 14 and has a first or retracted position spacedly related to the rear end edge 41 of a tube 16 in the loading position, as shown in FIG. 4. The assembly 44 is movable to a second or extended position cooperatively and sealably engaged with the rear end edge 41 of the tube 16 in the loading position, as shown in FIG. 5. When so engaged, the assembly 44 provides a means for introducing air or other fluid under pressure into the rear portion of the passage 26 for propelling or driving the piston 42 against the rearmost workpiece 32 in the row of workpieces 32 so as to eject the forward most workpiece 32 into the parts loader 12 as discussed above. The assembly 44 has a tapered tube-engaging first end or stopper portion 54 located adjacent to the rear end plate 24 of the turret assembly 14, and an opposite second end portion 52. The assembly 44 including the stopper portion 54 cooperatively and sealably engages the rear end edge 41 of the selected tube 16, the seal means shown including the tapered outer surface 53 of the stopper member 54, which stopper 54 can be fabricated from a material such or rubber or other resilient or compressible material. The stopper 54 can be made to be detachably mounted on the assembly 44, and the device 10 can be used with a number of different size stopper members 54 corresponding to various different sizes and shapes of the tubes 16. A fluid-communicating passage 56 extends through the stopper 54 and through the assembly 44 and the passage 56 communicates with a fitting 58 that receives the end of an air line 60. The opposite end of the air line 60 communicates with a pressure-controlled source of pressurized air or other fluid (not shown).

The assembly 44 is attached to means 62 which are provided for pneumatically moving it between its retracted position, as shown in FIG. 4, and its extended position, as shown in FIG. 5. The means 62 may include a pneumatic cylinder 62 as shown having an axially moveable piston and rod 64, one end of which is attached to the rear portion 52 of the assembly 44. The pneumatic cylinder 62 is actuable by compressed air introduced thereto through an air line 63 (FIG. 1) to extend or retract the piston rod 64 and in so doing to move the stopper member 54 into and out of sealed engagement with the rear edge 41 of the tube 16 in loading position. With the stopper 54 in seated condition, air or other fluid under pressure is introduced through the fluid line 60 into the passage 56 and into the passage 26 in the tube 16 to drive the piston 42 against the rearmost part 32 to advance all of the parts 32 in the tube 16. The magnitude and duration of pressurization in the passage 26 can be adjusted for a particular application, and can take the form of a short burst or pulse of relatively high pressure sufficient to drive the row of parts 32 toward the output tube end 28. In so doing the forward most part 32 is ejected from the tube 16 and loaded into the holding means 13. The pressurized condition is maintained until the ejected part 32 is fully loaded and stopped under pressure and the pressurized condition is then relieved to prevent further parts 32 movement. The assembly 44 can also be moved to a retracted position if the turret assembly 14 is to be rotated or indexed to eject the next part 32 from a different tube 16. The pneumatic cylinder 62 can be of a double acting construction. The turret 14 can also be operated so as to remain in one position such that succeeding parts 32 can be loaded from the same tube 16, or the turret 14 can be rotated using the rotating and indexing means 20 (as shown in FIGS. 1 and 2) as discussed below to position different tubes 16 in loading position on successive operations.

The rotating and indexing means 20 (FIG. 1) are operable to rotate and stop or index the turret 14 for positioning a desired tube 16 in the loading position. The rotating and indexing means 20 are stationary and include a rotary actuator 66 which, when actuated, rotates the turret assembly 14 in the desired clockwise (or counterclockwise) direction, at the conclusion of which the turret 14 will be stopped and latched for the succeeding feeding and loading operations. The turret assembly 14 is supported for rotational movement on forwardly and rearwardly located clutch bearing assemblies 68 and 70 (see FIG. 6). The rearward bearing assembly 70 is supported on a shaft 72 which is connected to the rotary actuator 66. In a typical operating sequence a workpiece 32 is loaded from the subject device 10 into the parts holding means 13 on the workstation 12 such as a honing machine. The loading operation occurs when the piston 42 moves the row of workpieces 32 against a stop (not shown) on the workpiece receiving means 12. This occurs by the operation of the air cylinder 62 and the pressure source connected thereto (not shown) located at the rear of the assembly 44 to drive the piston 42 forwardly by a blast of air. After a part 32 is loaded into the workstation or fixture 12 the air cylinder 62 is deactivated causing any air trapped in the tube 16 to be exhausted and the stopper 54 to be withdrawn from the tube 16. Once a workpiece 32 has been loaded into the fixture 12, the pressure-released air is introduced into the rotary actuator 66 to rotate the turret assembly 14 to align another tube 16 with the stopper 54 and the fixture 12. When the assembly 14 has been rotated to the next desired position, another air line (not shown) is actuated causing the rotary actuator to move in a reverse direction. This reversal allows the shaft 72 to rotate back to its starting position in preparation for the next rotational movement of the assembly 14 and the whole process is repeated each time another workpiece 32 is loaded into the fixture 12 and the turret assembly 14 rotated. The clutch and bearing assemblies 68 and 70 permit the turret assembly 14 to be rotated in one direction to advance it to feed from the next tube 16 but not in the opposite direction. This means that with the construction as shown, the turret assembly 14 will be rotated and indexed in a forward direction in the sequence described above. This also means that the clutch bearings 68 and 70 will be oppositely oriented, one (70) to drive the turret 14 and the other (68) to prevent movement in the reverse direction during return of the actuator 66. The rotary actuator 66 may be a pneumatically operated device capable of rotating the turret assembly 14 in the desired direction and through a desired angular displacement according to the angular spacing of the adjacent tubes 16 of the assembly 14. The roller clutch and bearing assemblies 68 and 70 may be of similar construction at both opposite ends 22 and 24 of the assembly 14. Fixed shaft 82 extends through the roller clutch and bearing assembly 68 similar to the shaft 72 which extends through the assembly 70.

The rotary actuator device 66 is preferably of a type wherein the angular displacement of the shaft 72 is determined by movements of means in the actuator 66, the angular displacement being adjustable using adjusting means such as shown at 78 located on the exterior of the device 66 (FIGS. 1 and 2). The forward end portion 22 of the turret assembly 14 is also shown supported in a cantilever fashion by turret support structure 80, and by arms 90 which will be described later in connection with FIG. 7.

Referring to FIG. 6, the forward roller clutch bearing assembly 68 is mounted in the forward plate 22 of the turret assembly 14 and cooperatively receives and engages the shaft 82 which is non-rotatably mounted on the arm portion 90 of the turret support structure 80.

The actuator roller clutch bearing assemblies 70 and 68 have locked or engaged modes in one direction of rotational operation of the assembly 14, and an overrun mode in the opposite direction, one being locked on the shaft 72 when the assembly 14 is being moved to another operating position, the other clutch bearing assembly (68) being locked to the shaft 82 to prevent reverse movement of the assembly 14. Using this arrangement, when the rotary actuator 66 is operated to rotate the output shaft 72 in the engaged direction for the actuator roller clutch bearing 70, the turret 14 will be rotated thereby, with the forward roller clutch bearing 68 operating in its overrun mode such that the turret 14 rotates relative to the fixed shaft 82. When the rotary actuator 66 is operated in the opposite or the overrun direction for the actuator roller clutch bearing 70, the actuation output shaft 72 will rotate relative to the turret assembly 14 and to the clutch 70 while shaft 82 will not rotate relative to the roller bearing clutch 68. In this manner, the rotary actuator 66 can be set or adjusted to accurately rotate in both the clockwise and counterclockwise directions through a single angular displacement corresponding with the angular relationship between adjacent tubes 16 of the turret assembly 14.

For the embodiment shown in FIG. 1 having eight tubes 16 angularly spaced at 45 degree intervals, to rotate from having one of the tubes 16 in the loading position to having an adjacent tube 16 in the loading position, the rotary actuator 66 is operated by pressure in an air line 74 to rotate the output shaft 72 and the engaged clutch bearing 70 to rotate the turret assembly 14 through an angular displacement of 45 degrees. The rotary actuator 66 can then be operated using pressure in an air line 76 to rotate the output shaft 72 in the reverse or overrun direction also through 45 degrees to bring it to its original or start position. A succeeding adjacent tube 16 will now be in its feeding and loading position, although some refinement in the position can be made by indexing, if necessary. For an alternative turret configuration 14 having, for instance, four tubes 16 arranged at 90 degree intervals such as shown in FIG. 7, the indexing procedure is the same, but the angular displacement of the rotary actuator 66 to position succeeding tubes 16 will be different.

The rotating and indexing means 20 can further optionally include detent or positioning and holding means 84 for maintaining the turret 14 at its particular angular positions. One form of detent means 84 is shown in FIGS. 4 and 5 and includes a spring loaded device 84 located adjacent to the periphery of the rear turret plate 24. The device 84 includes a detent ball member 85 which is biased against the peripheral surface of the end plate 24 by spring member 86 so that the ball 85 cooperatively engages or seats in one of the conical seats 87 that form the outer ends of the holes 40 when the turret assembly 14 is positioned with a corresponding tube 16 in alignment with the workstation 12. When the rotary actuator 66 is actuated, the force produced is sufficient to overcome the spring force on the ball member 85 so that the ball 85 can move out of engagement with the seat 87 to enable rotation of the turret 14 from one position to another.

The turret support structure 80, in addition to supporting the forward end portion 22 of the turret 14, also supports the workpiece advancing means 18 and the rotating and indexing means 20, which in turn support the rear end portion 24 of the turret assembly 14. The turret support structure 80 is shown as a cantilevered assembly comprising an L-shaped mounting bracket 86 for mounting the device 10 on a workstation 12 or other structure which may be part of the device or tool into which parts 32 are fed, and an elongated planar base plate member 88, one end of which is attached to the distal or terminal end of the mounting bracket 86 in cantilevered or other relation thereto. A forward support or cross arm assembly 90 shown having an L-shape is attached to the front or opposite end of the base member 88 adjacent to the forward end portion 22 of the turret assembly 14 as shown in FIGS. 1 and 6. One or more rear support members 92 are attached by suitable support means near the opposite or rear end of the base member 88. The workpiece advancing means 18 and the rotary actuator 66 are mounted on the member 92. The detent device 84 is shown mounted in a bore in the base member 88 (FIGS. 2 and 6).

OPERATION

The present parts loading device 10 can be operated using any suitable means of control, such as air lines connected to a source of air pressure. A programmable controller or the like can be used to control the connections of the various air lines to the pressure source. With any of the tubes 16 in the loading position, pressure from the source can be introduced into the air line 63 and from there into the air cylinder 62 to extend the air fitting 44 so that the stopper 54 sealably engages the rear open edge 41 of the aligned tube 16. Simultaneously, pressure can be introduced into the air line 60 to introduce air, under pressure, into nipple 58 and through the passage 56 to the passage 26 of the tube 16 in the loading position. The piston member 42 is then driven by pressure against the rear end of the row of work pieces 32 in the passage 26 to cause the forward most workpiece 32 to be ejected from the passage 26 and loaded into the receiving and holding device 12. When a part 32 has been loaded, air line 63 can be deactivated and the piston rod 64 of the air cylinder 62 retracted so as to disengage the stopper member 54 from the rear open tube end 30. The air line 74 can then be actuated to operate the rotary actuator 66 to rotate the output shaft 72 thereof to overcome the holding force of the detent ball 85 on the detent 84 and to rotate the assembly 14 through an angular displacement equal to the angular spacing between adjacent tubes 16 and position the succeeding tube 16 for loading parts 32 therefrom. The air line 63 and the air line 60 can then be used to eject and feed and load a part 32 from the second tube 16 in the manner discussed above. At any time after the turret member 14 has been rotated to position a selected tube 16 in the loading position, air line 76 can be actuated to operate the rotary actuator 66 to rotate the output shaft 72 in the overrun direction for the actuator 66 to return to its start position. When the next part 32 has been fed and loaded, as discussed above, the air line 74 can again be actuated to position the next tube 16 in the loading position, and so on.

Thus there has been shown and described a novel parts feeder and loader device which fulfills all of the objects and advantages set forth above. It will be apparent to those skilled in the art, however, that many changes, modifications, variations, and other uses and applications for the subject invention are possible. All such changes, modifications, variations and other uses and applications which do not depart from the spirit and scope of the invention are deemed to be covered by the invention which is limited only by the claims which follow.

What is claimed is:
1. A parts feeding apparatus comprising:
   a turret assembly rotatable about a central longitudinal axis thereof and including a plurality of longitudinally extending passages located at angularly spaced positions around the axis, each of said passages capable of accommodating a row of parts to be fed therefrom and each having opposite open ends, a piston member slideably and sealably positioned in at least one of said passages adjacent to one end of a row of parts therein, parts advancing means located adjacent to said one end of said turret assembly in position to move into sealed engagement with the open end of a selected one of said passages, said parts advancing means including a conduit for communicating a pressurized fluid source with the selected passage so as to enable said piston member and the row of parts to be moved in the selected passage in a direction toward the opposite open end thereof ejecting the end most part therefrom, and means for rotating the turret assembly to selectively position different ones of the passages in alignment with said parts advancing means such that said parts advancing means can sealably engage the adjacent end thereof to be used to advance the row of parts contained therein toward the respective opposite open end thereof.

2. The parts feeding apparatus of claim 1 wherein said turret assembly is of unitary construction.

3. The parts feeding apparatus of claim 1 wherein said parts advancing means includes a member having a frusto-conical outer surface sized to sealably engage the adjacent open end of each of the respective passages.

4. The parts feeding apparatus of claim 1 wherein each of said plurality of passages comprises a bore extending through a tubular member.

5. The parts feeding apparatus of claim 1 wherein said means for rotating the turret assembly includes a rotary actuator operatively connected thereto.

6. The parts feeding apparatus of claim 1 wherein said means for rotating the turret assembly includes at least one clutch mechanism.

7. A parts feeding apparatus comprising an elongated open ended tubular member having a passage therethrough constructed to accommodate a row of parts positioned therein, a piston member slideably and sealably positioned in said passage adjacent to one end of the row of parts therein, means located adjacent to one end of the tubular member in alignment with passage therein, said means including a fitting member adapted to sealably engage the adjacent passage end, means to move the fitting member between a retracted position spaced from the tubular member and an extended position wherein the fitting member is sealably engaged with the open end of the passage, conduit means having one end connected to the fitting for communicating with the passage on one side of the piston member and an opposite end for communicating with a source of pressure, means to introduce pressure into the passage sufficient to move the piston member and the row of parts in the passage in a direction to eject the forward most part in the row from the passage.

8. Apparatus for holding and feeding parts to a work station comprising a rotatable turret structure having a centrally located axis extending between spaced opposite ends thereof about which the turret structure is rotatable, means forming a plurality of open ended passages extending between the opposite ends of the turret structure at angularly spaced locations around the axis, each passage being sized and shaped for receiving and holding a plurality of parts in single file order therein, a piston member slideably and sealably located in each of the passages in position between the respective rows of parts therein and one end of the passage, parts advancing means located adjacent to said one passage end of the turret structure in position to sealably engage the open end of one of said passages on the side of the piston member opposite from the row of parts therein, said parts advancing means including a conduit having one end communicating with the passage and an opposite end communicating with a source of fluid pressure sufficient to drive the piston member against the row of parts with sufficient force to move the row of parts in the passage and to eject one of the parts therefrom, and means for rotating the turret structure to position different ones of the passages in alignment with the parts advancing means.

9. A parts feeding apparatus comprising a rotatable turret structure having a central longitudinal axis about which it is rotatable and a plurality of open ended passages located at angularly spaced positions around the longitudinal axis, each of said passages constructed to accommodate a row of parts therein, a piston member slideably and sealably positioned in each said passages adjacent to one end of the row of parts therein, means for rotating said turret about the axis including means to locate each of the selected passages one at a time at a predetermined parts loading position, means located adjacent to one end of said turret structure in alignment with the passage in the parts loading position, said means including a fitting member adapted to be moved into sealed engagement with the adjacent passage end, conduit means having one end connected to the fitting for communications with the passage and an opposite end for communicating with a source of pressure, means to move the fitting member between a retracted position spaced from the said turret structure and an extended position wherein said fitting member is sealably engaged with the open end of the passage located in the parts loading position, the introduced pressure being sufficient to move the piston and the row of parts in the passage and to eject the forward most part in the row from the passage.

10. A parts loading apparatus comprising:
a turret assembly rotatable about a central longitudinal axis extending between first and second opposite ends thereof, a plurality of longitudinally extending open ended passages located at angularly spaced positions around the axis, each of said passages accommodating a row of parts in end-to-end relation therein and having opposite open ends adjacent respectively the first and second opposite ends of said turret assembly, a piston member slideably and sealably positioned in each of said passages between the row of parts therein and one of said opposite passage ends,
parts advancing means located adjacent to the one opposite end of a selected one of said passages, said parts advancing means including means movable into sealable engagement with the end of the selected passage, said parts advancing means including a conduit having one end for communicating with the selected passage and an opposite end for communicating with a source of pressure sufficient to drive the piston against a row of parts therein such that the endmost part opposite said piston member in the selected passage is ejected from the selected passage, and
means for rotating the turret assembly to position different ones of the passages in alignment with said parts advancing means.

11. The parts loading apparatus of claim 10 wherein said parts advancing means includes a tapered member sized to sealably engage the open end of different ones of the selected passages.

12. The parts loading apparatus of claim 11 wherein said means movable into sealable engagement is detachable and replaceable.

13. The parts loading apparatus of claim 10 wherein said means for rotating the turret assembly include a rotary actuator.

14. The parts loading apparatus of claim 10 wherein said means for rotating the turret assembly include at least one clutch mechanism.

* * * * *